United States Patent
Manukyan et al.

(10) Patent No.: US 10,338,373 B2
(45) Date of Patent: Jul. 2, 2019

(54) ELECTROWETTING ELEMENT WITH RIDGE

(71) Applicant: Amazon Technologies, Inc., Seattle, WA (US)

(72) Inventors: Gor Manukyan, Veldoven (NL); Gerben Boon, Roermond (NL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/975,393

(22) Filed: Dec. 18, 2015

(65) Prior Publication Data

US 2017/0176738 A1    Jun. 22, 2017

(51) Int. Cl.
*G02B 26/00* (2006.01)
*G02B 26/08* (2006.01)

(52) U.S. Cl.
CPC .......... *G02B 26/005* (2013.01); *G02B 26/004* (2013.01); *G02B 26/0841* (2013.01)

(58) Field of Classification Search
CPC ................ G02B 26/004; G02B 26/005; G02B 26/0841; G09G 3/348
USPC ................................................. 359/290–292
See application file for complete search history.

(56) References Cited

U.S. PATENT DOCUMENTS

| | | | |
|---|---|---|---|
| 8,730,555 B2 | 5/2014 | Aubert et al. | |
| 9,110,284 B2 | 8/2015 | Manukyan et al. | |
| 9,207,450 B1 | 12/2015 | Manukyan et al. | |
| 2010/0296149 A1* | 11/2010 | Feenstra | G02B 26/005 359/290 |
| 2012/0057217 A1 | 3/2012 | Ku et al. | |
| 2013/0250396 A1* | 9/2013 | Kim | G02B 26/005 359/290 |
| 2013/0342889 A1* | 12/2013 | Kim | G02B 26/005 359/290 |
| 2014/0029080 A1* | 1/2014 | Hwang | G02B 26/005 359/290 |
| 2014/0313177 A1* | 10/2014 | Van Dijk | G02B 3/14 345/211 |
| 2015/0084942 A1 | 3/2015 | Mennen et al. | |

(Continued)

FOREIGN PATENT DOCUMENTS

| | | | |
|---|---|---|---|
| WO | WO 2006017129 A2 * | 2/2006 | ........... G02B 26/004 |
| WO | 2011113787 A1 | 9/2011 | |
| WO | 2013026877 A1 | 2/2013 | |

OTHER PUBLICATIONS

International Search Report and Written Opinion dated May 11, 2017 for PCT Application No. PCT/EP2016/081625.

*Primary Examiner* — Stephone B Allen
*Assistant Examiner* — Rahman Abdur
(74) *Attorney, Agent, or Firm* — EIP US LLP

(57) ABSTRACT

An electrowetting element comprising a first fluid and a second fluid immiscible with the first fluid. A first support plate comprises: a first support plate surface in contact with at least one of the first fluid or the second fluid, a substrate having a substrate surface, an electrode and a ridge. The ridge comprises a substantially parallel ridge surface substantially parallel to the substrate surface and a sloping ridge surface angled relative to the substantially parallel ridge surface. A wall is located at least partly on the substantially parallel ridge surface. The ridge is configured to reduce a flow of the first fluid along an inner surface of the wall.

25 Claims, 5 Drawing Sheets

(56) References Cited

U.S. PATENT DOCUMENTS

2015/0085342 A1* 3/2015 Manukyan ............ G02B 26/004
                                                                                                    359/290

* cited by examiner

ELECTROWETTING ELEMENT WITH RIDGE

BACKGROUND

In an off state of an electrowetting element of a known electrowetting display device an oil covers a display area. In an on state the oil is retracted so as to cover less of the display area. To switch the electrowetting element to the on state a voltage is applied between an electrode and an electrically conductive fluid immiscible with the oil. When the voltage is applied, the oil layer breaks up due to electrostatic forces. The contrast of the electrowetting element is limited by the fraction of the display area occupied by the oil after the break-up of the oil layer.

It is desirable to provide an electrowetting element with an improved display quality.

DETAILED DESCRIPTION

Figure 1:
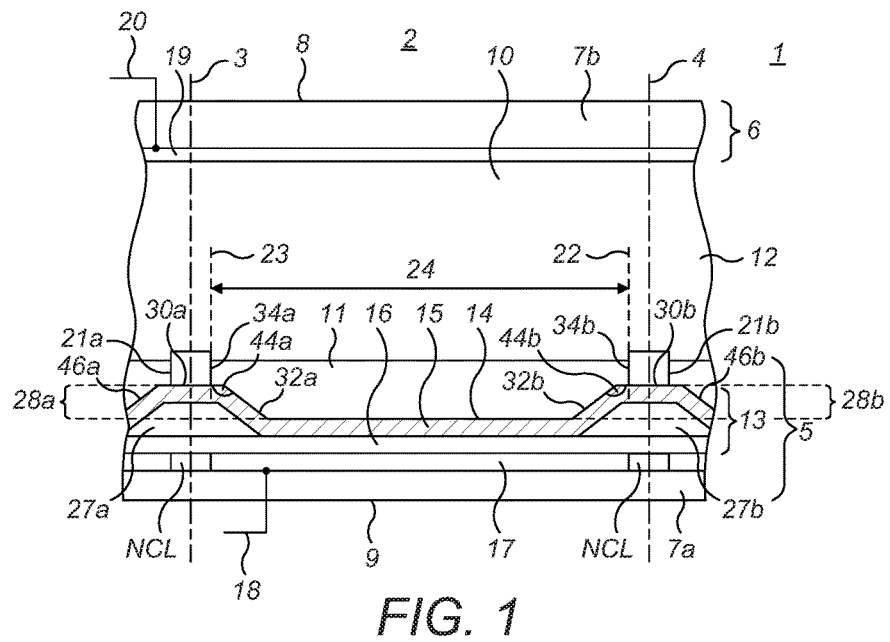
FIG. 1 shows schematically a cross-section of an example electrowetting element.

FIG. 1 shows a diagrammatic cross-section of part of an electrowetting display device 1 according to examples. The electrowetting display device 1 includes a plurality of picture elements or display elements 2, one of which is shown in the FIG. and which may also be referred to as an electrowetting cell or electrowetting element. The lateral extent of the electrowetting element is indicated in the FIG. by two dashed lines 3, 4. The electrowetting elements comprise a first support plate 5 and a second support plate 6. The support plates may be separate parts of each electrowetting element, but the support plates may be shared in common by the plurality of electrowetting elements. The support plates may include a glass or polymer substrate 7a, 7b and may be rigid or flexible. The support plates in some examples include further layers and/or structures than illustrated, for example circuitry for controlling the electrowetting elements. Such features are not illustrated, for clarity.

The display device has a viewing side 8 on which an image or display formed by the display device can be viewed and a rear side 9. In the FIG., a surface of the first support plate 5, which surface is in this example a surface of the substrate 7a, corresponds with the rear side 9; a surface of the second support plate 6, which surface is in this example a surface of the substrate 7b, corresponds with the viewing side; alternatively, in other examples, a surface of the first support plate may correspond with the viewing side. The display device may be of the reflective, transmissive or transflective type. The display device may be an active matrix driven display device. The plurality of electrowetting elements may be monochrome. For a colour display device the electrowetting elements may be divided in groups, each group having a different colour; alternatively, an individual electrowetting element may be able to show different colours.

A space 10 of each electrowetting element between the support plates is filled with two fluids: a first fluid 11 and a second fluid 12, at least one of which may be a liquid. The second fluid is immiscible with the first fluid. Therefore, the first fluid and the second fluid do not substantially mix with each other and in some examples do not mix with each other to any degree. The immiscibility of the first and second fluids is due to the properties of the first and second fluids, for example their chemical compositions; the first and second fluids tend to remain separated from each other, therefore tending not to mix together to form a homogeneous mixture of the first and second fluids. Due to this immiscibility, the first and second fluids meet each other at an interface which defines a boundary between the volume of the first fluid and the volume of the second fluid; this interface or boundary may be referred to as a meniscus. With the first and second fluids substantially not mixing with each other, it is envisaged in some examples that there may be some degree of mixing of the first and second fluids, but that this is considered negligible in that the majority of the volume of first fluid is not mixed with the majority of the volume of the second fluid.

The second fluid is at least one of electrically conductive or polar and may be water, or a salt solution such as a solution of potassium chloride in water. The second fluid may be transparent; it may instead be coloured, white, absorbing or reflecting. The first fluid is electrically non-conductive and may for instance be an alkane like decane or hexadecane, an oil such as silicone oil, or decalin.

An electrically conductive second fluid is generally capable of conducting electricity; for example an electrical current may flow through the second fluid due to the flow of ions or electrons through the second fluid. A polar second fluid in examples comprises at least one compound having a molecule with a net dipole; e.g. that across the molecular structure the molecule has an overall dipole moment, due to an electron distribution, with at least one part of the molecule having a negative electrical charge and at least one different part of the molecule having a positive electrical charge. Such dipole moments include permanent dipoles. The polarity is caused for example by the presence of one or more atom to atom bonds in the molecule, with for example one of the atoms being a heteroatom such as oxygen or nitrogen. For example, such a polar atom to atom bond is a bond between an oxygen (O) atom and a hydrogen (H) atom, i.e. an —O—H bond, which may be in some examples due to the presence of at least one hydroxyl (—OH) group. The presence of such bonds may cause hydrogen bonding between different molecules within the second fluid.

The first fluid may absorb at least a part of the optical spectrum. The first fluid may be transmissive for a part of the optical spectrum, forming a colour filter. For this purpose the first fluid may be coloured by addition of pigment particles or a dye. Alternatively, the first fluid may be black, for example absorb substantially all parts of the optical spectrum, or reflecting. A reflective first fluid may reflect the entire visible spectrum, making the layer appear white, or part of it, making it have a colour.

The first support plate 5 includes an insulating layer 13. The insulating layer may be transparent or reflective. The insulating layer 13 may extend between walls of an electrowetting element. To avoid short circuits between the second fluid 12 and electrodes arranged under the insulating layer, layers of the insulating layer may extend uninterrupted over a plurality of electrowetting elements 2, as shown in the FIG. The insulating layer has a surface 14 nearest to the space 10 of the electrowetting element 2. In this example the surface 14 is hydrophobic. The thickness of the insulating layer may be less than 2 micrometers and may be less than 1 micrometer.

The insulating layer may be a hydrophobic layer; alternatively, it may include a hydrophobic layer 15, an organic layer 27 (which in this example includes a first organic layer 27a and a second organic layer 27b), and a barrier layer 16 with predetermined dielectric properties, the hydrophobic layer 15 closest to the space 10, as shown in the FIG. The hydrophobic layer is schematically illustrated in FIG. 1 and may be formed of Teflon® AF1600. The barrier layer 16 may have a thickness, taken in a direction perpendicular to the plane of the substrate, between 50 nanometers and 500 nanometers and may be made of an inorganic material like silicon oxide or silicon nitride.

The hydrophobic character of the surface 14 causes the first fluid 11 to preferentially adjoin the insulating layer 13, since the first fluid has a higher wettability with respect to the surface of the insulating layer 13 than the second fluid 12. Wettability relates to the relative affinity of a fluid for the surface of a solid. Wettability may be measured by the contact angle between the fluid and the surface of the solid. The contact angle is determined by the difference in surface tension between the fluid and the solid at the fluid-solid boundary. For example, a high difference in surface tension can indicate hydrophobic properties.

Each electrowetting element 2 includes a first electrode 17 as part of the support plate 5. In examples shown there is one such electrode 17 per electrowetting element. The electrode 17 is electrically insulated from the first and second fluids by the insulating layer 13; electrodes of neighboring electrowetting elements are separated by a non-conducting layer NCL. In some examples, further layers may be arranged between the insulating layer 13 and the electrode 17. The electrode 17 can be of any desired shape or form. The electrode 17 of an electrowetting element is supplied with voltage signals by a signal line 18, schematically indicated in the FIG.

The support plate 6 includes a second electrode 19, which may extend between walls of an electrowetting element or extend uninterruptedly over a plurality of electrowetting elements 2, as shown in the FIG. The electrode 19 is in electrical contact with the conductive second fluid 12 and is common to all electrowetting elements. The electrode may be made of for example the transparent conductive material indium tin oxide (ITO). A second signal line 20 is connected to the electrode 19. Alternatively, the electrode may be arranged at a border of the support plates, where it is in electrical contact with the second fluid. This electrode may be common to all elements, when they are fluidly interconnected by and share the second fluid, uninterrupted by walls. The electrowetting element 2 can be controlled by a voltage V applied between the signal lines 18 and 20. The signal line 18 can be coupled to a matrix of control lines on the substrate 7a. The signal line 20 is coupled to a display driving system.

The first fluid 11 in examples, for example that of FIG. 1, is typically confined to one electrowetting element by walls, including a first wall 21a and a second wall 21b. The walls are collectively referred to with the reference numeral 21 and follow the cross-section of the electrowetting element. The cross-section of an electrowetting element may have any shape; when the electrowetting elements are arranged in a matrix form, the cross-section is usually square or rectangular. Although the walls are shown as protruding structures in FIG. 1, they may instead be a surface layer of the support plate that repels the first fluid, such as a hydrophilic or less hydrophobic layer. The walls may extend from the first to the second support plate but may instead extend partly from the first support plate to the second support plate as shown in FIG. 1. The extent of the electrowetting element, indicated by the dashed lines 3 and 4, corresponds with the center of the walls 21. The area of the first support plate 5 between the walls of an electrowetting element, indicated by the dashed lines 22 and 23, is called the display area 24, over which a display effect occurs. Each of the walls has a corresponding inner wall surface within the electrowetting element. In examples, an inner wall surface of a wall corresponds with or is coincident with a boundary or outer limit of the display area 24. For example, in FIG. 1, first and second inner wall surfaces of the first and second walls 21a, 21b are coincident with the dashed lines 22, 23 respectively. The inner wall surface of a wall of an electrowetting element is generally approximately flat or planar and may be perpendicular to a plane of the display area 24 of the electrowetting element, although in some examples one or more walls of the electrowetting element may be angularly displaced with respect to a plane of the display area 24 in a central region of the electrowetting element.

The display area 24, which is between the walls of an electrowetting element as noted above, in examples is a first support plate surface of the first support plate 5 in contact with at least one of the first fluid 11 or the second fluid 12. The display effect depends on an extent that the first and second fluids adjoin the first support plate surface corresponding to the display area, in dependence on the magnitude of the applied voltage V described above. The magnitude of the applied voltage V therefore determines the configuration of the first and second fluids within the electrowetting element. In other words, the display effect depends on the configuration of the first and second fluid in the electrowetting element, which configuration depends on the magnitude of the voltage applied to the electrodes of the electrowetting element. The display effect gives rise to a display state of the electrowetting element for an observer looking at the display device. When switching the electrowetting element from one fluid configuration to a different fluid configuration the extent of second fluid adjoining the display area surface may increase or decrease, with the extent of first fluid adjoining the display area surface decreasing or increasing, respectively. The electrowetting element is typically switchable between a first configuration of the first fluid and the second fluid with a non-zero voltage between the electrode and the second fluid, in which the first fluid is retracted, e.g. so that both the first fluid and the second fluid adjoin the first support plate surface, and a second configuration of the first fluid and the second fluid with a zero voltage applied between the electrode and the second fluid, in which the first fluid is spread out, e.g. in the form of a layer, to cover the display area 24. In examples, the electrowetting element is considered to be in the first configuration when a non-zero voltage is applied between the electrode and the second fluid and in the second configuration when a zero voltage is applied between the electrode and the second fluid, regardless of the position or location of the first and second fluids. For example, it may take some time for the first fluid to flow back to cover the display area when the zero voltage is applied. Nevertheless, the electrowetting element in these examples is considered to be switched to the second configuration from the moment and while the zero voltage is applied.

When a zero or substantially zero voltage is applied between the electrodes 17 and 19, for example when the electrowetting element is in an off state, the first fluid 11 forms a layer between the walls 21, as shown in FIG. 1, which for example corresponds with the second configuration. Application of a voltage will retract the first fluid to a retracted configuration, for example any configuration of the first fluid where the second fluid adjoins part of the display area such as the first configuration described above, for example a retracted configuration with the first fluid contracted against a wall as shown by the dashed shape 25 in FIG. 3 (described in detail below). The controllable shape of the first fluid, in dependence on the magnitude of applied voltage, is used to operate the electrowetting element as a light valve, providing a display effect over the display area 24. For example, switching the fluids to increase adjoinment of the second fluid with the display area may increase the brightness of the display effect provided by the element. This display effect determines the display state an observer will see when looking towards the viewing side of the display device. The display state can be from black to white with any intermediate grey state; in a colour display device, the display state may also include colour.

In examples such as that of FIG. 1 the first support plate 5 of the electrowetting element 2 comprises at least one ridge, in this example first and second ridges 28a, 28b. A ridge is typically an elongate banked structure, which is for example elongate along a side of the display area 24 or along a side of the electrowetting element 2, which generally extends upwards or away from the surface 14 of the insulating layer 13. For example, the ridge may protrude or be enlarged in a direction away from the first support plate relative to a different part of the first support plate 5, such as a central portion of the display area 24, which in examples such as that of FIG. 1 is the portion of the display area 24 between the first and second ridges 28a, 28b. The central portion of the display area 24 may be the furthest portion of the display area 24 from the second support plate 6 or a portion of the display area 24 that is recessed with respect to the wall and/or ridge, for example. In the example of FIG. 1, the first ridge 28a includes the part of the hydrophobic layer 15 that is raised with respect to the central portion of the display area 24 and the part of the organic layer 27a that is beneath this part of the hydrophobic layer 15 and which is also raised with respect to the central portion of the display area 24. Therefore, in FIG. 1, part of the organic layer 27a forms the first ridge 28a (the part that is raised, above or upwards from a plane of the central portion of the display area 24 for example), and part of the organic layer 27a is beneath the first ridge 28a (the part that is in the same plane or beneath or lower than the plane of the central portion of the display area 24). The second ridge 28b of FIG. 1 has a similar structure to the first ridge 28a. Features of the second ridge 28b similar to features of the first ridge 28a are referred to using the same reference numeral appended with a "b" rather than an "a"; corresponding descriptions should be taken to apply also, although it is to be appreciated that in other examples the first and second ridges may have different structures, and therefore different structural features for example, from each other.

The ridge in examples comprises a sloping ridge surface and a substantially parallel ridge surface substantially parallel to a substrate surface of a substrate of the first support plate. The substrate is for example the substrate 7a of FIG. 1, which substrate underlies or is overlapped by the ridge. The substrate surface in the example of FIG. 1 is the surface of the substrate closest to the first fluid and the second fluid, although in other examples the substrate and/or the substrate surface may be different from that illustrated in FIG. 1. In examples, the substrate surface is substantially planar or planar. A plane of the substrate surface may be substantially parallel to a plane of a surface of the second support plate in contact with the first fluid and/or the second fluid, for example within plus or minus 10 degrees. The sloping ridge surface is angled relative to the substantially parallel ridge surface. For example a plane of the sloping ridge surface may be angularly displaced relative to a plane of the substantially parallel ridge surface. The sloping ridge surface may also be angled relative to a different part of the first support plate 5, such as the central portion of the display area 24 and/or angled relative to the substrate surface. In examples, the sloping ridge surface is sloped, tilted or angled with respect to the horizontal, for example where the substantially parallel ridge surface also lies approximately in a horizontal plane, although in other examples the sloping ridge surface is itself horizontal and the substantially parallel ridge surface is in a non-horizontal plane. The sloping ridge surface typically slopes away from, for example down away from, the substantially parallel ridge surface. The substantially parallel ridge surface is therefore generally closer to the second support plate 6 than the sloping ridge surface. For example, a first distance between a first edge of the sloping ridge surface closest to the substantially parallel ridge surface and the second support plate 6 may be less than a second distance between a second edge of the sloping ridge surface furthest from the substantially parallel ridge surface.

The sloping ridge surface may itself be substantially planar or planar. A substantially planar surface is typically generally or predominately planar or flat, taking into account manufacturing tolerances, or with an angular surface variation of less than plus or minus 10 degrees from a plane passing through a central axis of the sloping ridge surface. Thus, a surface that has been roughened, for example to aid adhesion between the surface and another component or element, may be considered substantially planar, provided that surface height variations due to the roughening process are small, for example less than a few nanometers or less than a few tens of nanometers. FIG. 1 shows an example of first and second sloping ridge surfaces 32a, 32b of the first and second ridges 28a, 28b respectively, which in this example are substantially planar. In other examples the sloping ridge surface has a different topology; for example, the sloping ridge surface may be curved. In examples in which there are a plurality of ridges, each ridge of the plurality of ridges may have the same or a different shape from each other.

In the example of FIG. 1, the first and second ridges 28a, 28b extend beyond the extent of the electrowetting element 2 and into an adjacent element. Therefore, a ridge with at least a substantially parallel ridge surface and a sloping surface within a particular electrowetting element is generally considered to be part of that electrowetting element even if other portions of the ridge are outside that electrowetting element, e.g. in an adjacent electrowetting element.

A wall of the electrowetting element, also known as a pixel wall, is at least partly located on the substantially parallel ridge surface of the ridge in examples. In the example of FIG. 1, the first and second walls 21a, 21b are located directly on, and therefore in contact with, the first and second ridges 28a, 28b respectively. In other examples, there is an intervening layer or layers between the wall and the substantially parallel ridge surface of the ridge such that the wall is not in direct contact with the substantially parallel ridge surface, but is nevertheless generally supported by the substantially parallel ridge surface. For example, the wall may overlap or be located above the substantially parallel ridge surface.

In examples such as FIG. 1, the substantially parallel ridge surface is substantially horizontal, for example within plus or minus 10 degrees from a horizontal plane, although in other examples the substantially parallel ridge surface lies in a plane different from the horizontal plane. The substantially parallel ridge surface in examples is planar or substantially planar. For example, the substantially parallel ridge surface may be sufficiently planar to allow the wall to be located thereon without the wall slipping or sliding off, for example when the electrowetting display device is moved, tilted or shaken. For example, the substantially parallel ridge surface of the ridge may be planar to the extent that results from manufacture of the ridge by depositing ridge material onto a substantially horizontal substrate using a spincoating or slot die coating process without planarizing the ridge material.

The inventors have surprisingly realized that one or more ridges such as those of FIG. 1 can be used to reduce or prevent flow of the first fluid along an inner surface of the wall, within the electrowetting element, e.g. along the first wall inner surface 34a and the second wall inner surface 34b of the first and second walls 21a, 21b respectively of FIG. 1, with the first fluid and the second fluid switched to the first configuration, for example with a non-zero voltage applied between the electrode and the second fluid. Thus, examples include a ridge configured to reduce a flow of the first fluid along an inner surface of the wall with the first fluid and the second fluid switched to the first configuration, e.g. when the non-zero voltage is maintained, held or sustained. In these examples, the ridge reduces movement or motion of the first fluid from one position or location on the inner surface of the wall, for example along what may be considered to be a channel or gutter along an interface between the inner surface of the wall and the display area, e.g. due to capillary action, to a different position or location on the inner surface of the wall with the first fluid and the second fluid switched to the first configuration.

Figure 2:
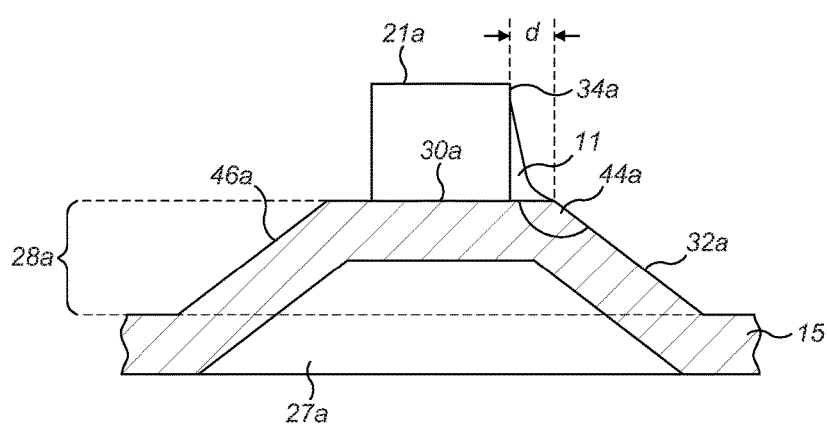
FIG. 2 shows schematically a cross-section of one of the ridges of FIG. 1.
Figure 3:
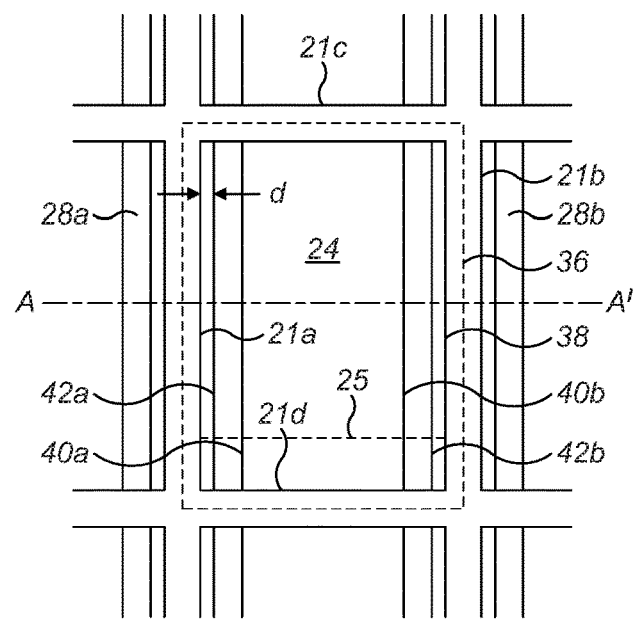
FIG. 3 shows schematically a plan view of the electrowetting element of FIG. 1.

The first ridge 28a of FIG. 1 is shown in more detail in FIG. 2, which shows the electrowetting element 2 of FIG. 1 with a non-zero voltage between the first electrode 17 and the second fluid 12 (not shown) maintained, with the first fluid 11 and the second fluid 12 in the first configuration. When the non-zero voltage is applied, the first fluid 11 retracts, as explained above. However, in some examples the first fluid 11 may not retract in the form of a continuous layer or sheet. The first fluid 11 may instead split or separate into a plurality of separate or distinct portions as it retracts, when the non-zero voltage is maintained. For example, the layer of the first fluid may break up due to electrostatic forces and parts or portions of the second fluid may penetrate the layer of the first fluid. For example, the first fluid 11 may separate into one or more portions trapped in a region near or adjoining the wall, e.g. due to intermolecular forces between the first fluid 11 and the wall, and/or one or more portions, e.g. droplets, in a part of the display area away from the wall. FIG. 2 shows an example of a first fluid 11 portion, which has formed on the first substantially parallel ridge surface 30a of the first ridge 28a. In FIGS. 1 to 3, the second ridge 28b is similar to the first ridge 28a and has a second substantially parallel ridge surface 30b similar to the first substantially parallel ridge surface 30a.

As noted above, portions of the first fluid may become trapped or confined in a region near a wall of the element. Individual portions of first fluid can join up or coalesce with other portions of first fluid to form fewer portions of first fluid but of a larger size or volume. The portions of first fluid may also migrate from the inner surface of the wall and into the display area of the known electrowetting element, and may join up with portions or droplets of the first fluid that occupy part of the display area away from the wall after break-up of the first fluid layer. The contrast of the electrowetting element is generally limited by the fraction of the display area occupied by the first fluid, which is typically coloured or black, when a non-zero voltage is applied between the electrode and the second fluid. Thus, effects including break-up of the first fluid layer when the non-zero voltage is applied between the electrode and the second fluid, or migration of portions of first fluid from near the wall into a central part of the display area may affect the contrast of the electrowetting element.

However, with the first ridge 28a of FIGS. 1 and 2 configured to reduce a flow of the first fluid 11 along the first wall inner surface 34a of the first wall 21a with the first fluid and the second fluid switched to the first configuration, the portion of the first fluid 11 generally remains close to, for example adjoining, the first wall inner surface 34a of the first wall 21a, and does not travel or move along the first wall inner surface 34a of the first wall 21a and into the display area 24 or to coalesce with other first fluid portions. For example, a ridge according to examples herein may be configured to reduce a flow of the first fluid from the inner surface of the wall and into the display area. In further examples, a ridge according to examples herein may additionally or alternatively be configured to prevent or reduce the break-up of the layer of first fluid into portions near to the wall, or the size or volume of portions of first fluid formed near to or adjoining the wall when a non-zero voltage is applied between the electrode and the second fluid.

A ridge configured according to examples herein can improve the display quality of the electrowetting element compared with an element without such a ridge, for example by improving contrast as explained above. For example, where the first fluid is coloured, portions of the first fluid in the display area of the electrowetting element, e.g. due to break-up of the first fluid layer when a voltage is applied between the electrode and the second fluid, can reduce the transmission of light through the display area of the electrowetting element, reducing the display quality of electrowetting element. For example, the display effect obtained with a particular voltage applied to the electrode of the electrowetting element may be darker than intended if first fluid portions are present in the display area, as the light intended to pass through the display area, e.g. from a backlight or from ambient light, is obscured by the coloured first fluid portions. This can therefore lead to an incorrect brightness or greyscale being displayed by the electrowetting element. Moreover, it may no longer be possible obtain the whitest or lightest display state, e.g. with the first fluid maximally retracted, as even if a voltage corresponding to such a display state is applied, portions of the first fluid in the display area would tend to make the display state appear darker, e.g. with reduced transmission of light through the electrowetting element. Thus, such first fluid portions may reduce the range of display states obtainable by the electrowetting element, for example as the lightest state may be darker than for an electrowetting element which does not suffer from first fluid portions in the display area. Therefore, by preventing or reducing the formation of first fluid portions, e.g. near to a wall of the display element, and reducing the flow of such first fluid portions along the walls and into the display area, a ridge in accordance with examples herein can obviate the need for correction of the brightness or greyscale of display states obtainable by the electrowetting element. Furthermore, a higher maximum brightness may be obtained than in a known electrowetting element without such a ridge.

Moreover, by reducing flow of first fluid portions along the inner surface of a wall, the ridge in examples prevents separate first fluid portions from coalescing with other first fluid portions. Thus, even if some first fluid portions do migrate to the display area, such portions will typically be smaller than in a known electrowetting element without a ridge in accordance with examples, in which multiple first fluid portions may join together to form a smaller number of larger portions. Smaller first fluid portions may be less noticeable than large first fluid portions in the display area, further improving the display quality of an electrowetting element with a ridge as described herein. For example, the ridge may help control the retraction of the first fluid, reducing the break-up of the first fluid into separate portions that can partially obscure the display area.

In examples, the ridge is configured to reduce a flow of the first fluid along the inner surface of the wall with the first fluid and the second fluid switched to the first configuration after a reset pulse has been applied. For example, when a non-zero voltage is applied between the electrode and the second fluid, the first fluid and the second fluid will be switched to the first configuration. A reset pulse, for example a zero voltage pulse, may be applied after the first fluid and the second fluid have been switched to the first configuration, to prevent or reduce backflow in the electrowetting element. Backflow is the phenomenon that, in spite of the fact that a non-zero voltage is maintained across the electrowetting element, the position of at least one of the first or the second fluid tends to recede to the position of the fluids when a zero voltage is applied between the electrode and the second fluid, e.g. the second configuration. In examples in which the reset pulse is a zero voltage pulse, the first fluid will tend to flow back to cover the display area when the zero voltage pulse is applied between the electrode and the second fluid, e.g. by flowing from a region of the display area near to a wall to a central region of the display area. When the non-zero voltage is applied again after the reset pulse, any retraction of the first fluid, e.g. back towards the wall of the electrowetting element from which it flowed away when the reset pulse was applied, may initiate capillary action along the wall and/or formation of first fluid portions in a region near the wall. This can cause portions of first fluid to flow along the wall and into the display area in a known electrowetting element without a ridge. However, a ridge in examples typically improves the control of the retraction of the first fluid and can reduce or eliminate capillary flow of the first fluid along the inner wall surface of the wall and into the display area.

In the example of FIG. 1, the volume of the first fluid 11 is such that, when no voltage is applied between the electrodes 17, 19, the first fluid 11 has a thickness substantially equal to a combined height of the first wall 21a and the first ridge 28a supporting the first wall 21a, the combined height being substantially parallel to the thickness. For a certain volume of first fluid 11, the height of the wall may be less in examples with a ridge, in which the combined height of the wall and the ridge is substantially equal to the first fluid 11 thickness, than in a known electrowetting element in which there is no ridge and in which the height of the wall is substantially equal to the first fluid 11 thickness. For example, a height of the wall may be less than a height of the ridge, although in other examples the wall and the ridge may have substantially the same height, for example the same height within manufacturing tolerances, or the same height as each other. A reduced wall height in examples further reduces formation of satellites of first fluid, as there is less space between the wall and the substantially planar surface of the ridge for first fluid satellites to occupy.

FIG. 3 shows a matrix of rectangular electrowetting elements including the electrowetting element 2 of FIG. 1 in a plan view of the hydrophobic surface 14 of the first support plate 5, where FIG. 1 is a cross section of the matrix of electrowetting elements of FIG. 3 taken along the line A-A' in FIG. 3. The extent of the central electrowetting element in FIG. 3, corresponding to the dashed lines 3 and 4 in FIG. 1, is indicated by the dashed line 36. Line 38 corresponds to the respective inner surfaces of the walls 21 in FIG. 1; the line is also the edge of the display area 24.

FIG. 3 shows the first and second ridges 28a, 28b of FIG. 1 in plan view; the lines 40a, 40b correspond with an inner boundary of the first and second ridges 28a, 28b respectively in the display area 24 of the electrowetting element 2. The inner boundary of the first ridge 28a in examples corresponds with an intersection between the sloping ridge surface 32a of the first ridge 28a and a substantially planar surface of the first support plate 5, in this example a central portion of the hydrophobic surface 14 of the insulating layer 13, e.g. where the first ridge 28a meets or joins the central portion of the hydrophobic surface 14 in a plane of the central portion of the hydrophobic surface 14. A first boundary 42a of the first substantially parallel ridge surface of the first ridge 28a in the electrowetting element is also shown in FIG. 3. The boundary of the substantially parallel ridge surface, e.g. the first boundary 42a of the first substantially parallel ridge surface, in examples such as that of FIG. 3 corresponds with a border, extremity or limit of the substantially parallel ridge surface, e.g. where the surface of the ridge is angled relative to the substrate surface or ceases to be substantially planar. For example, the boundary of the substantially parallel ridge surface may be in a location where the substantially parallel ridge surface meets the sloping surface of the ridge.

In examples such as that of FIGS. 1 to 3, a distance between the inner surface of the wall and a boundary of the substantially parallel ridge surface, e.g. a boundary of the substantially planar ridge surface within the electrowetting element, and in a direction substantially perpendicular or perpendicular to the inner surface of the wall, satisfies a distance condition for the flow of the first fluid along the inner surface of the wall to be reduced. For example, with a distance between the inner surface of the wall and the boundary of the substantially parallel ridge surface as in these examples, the surface area available for first fluid portions to occupy on the substantially parallel ridge surface, e.g. when the layer of the first fluid breaks up when a non-zero voltage is applied between the electrode and the second fluid, may be reduced, thereby reducing the rate at which such first fluid portions are formed and/or the size or volume of first fluid portions formed. For example, the distance may improve control of motion of the first fluid as the first fluid retracts, and reduce break-up of the first fluid into separate portions. If this distance is sufficiently small, for example with the distance condition satisfied, first fluid portions typically will not be able to form when the layer of the first fluid breaks up or will be sufficiently small that capillary action causing flow of the first fluid along the inner surface of the wall, and formation of visible portions of the first fluid in the display area of the electrowetting element, will be eliminated or reduced as explained further above.

The skilled person will readily appreciate suitable techniques to determine distances that satisfy the distance condition. For example, the skilled person could arrange a series of electrowetting elements, each with a different test distance between the inner surface of the wall and the boundary of the substantially parallel ridge surface. The skilled person could switch the first fluid and the second fluid to the first configuration for each of these electrowetting elements and take a series of images or a video of each of the electrowetting elements, e.g. through a microscope. A coloured or black first fluid flowing along the inner surface of the inner wall, e.g. into the display area, would be visible in such images or video. Therefore, by observing these images or video, the skilled person would be able to ascertain whether each of the test distances satisfies the distance condition and reduces the flow of the first fluid along the inner surface of the inner wall, for example by comparing these images or video with images or video of an electrowetting element without a ridge.

Although in examples this distance is substantially zero, for example zero or less than 2 micrometers, it has also been surprisingly realized that flow of the first fluid along the inner surface of the wall can be sufficiently reduced with a non-zero distance between the inner surface of the wall and the boundary of the substantially parallel ridge surface in the electrowetting element. For example, this distance may be less than or equal to approximately 5 micrometers or approximately equal to zero micrometers, for example 5 micrometers or zero micrometers within manufacturing errors. This can make it easier to align the wall with the ridge during manufacture of the electrowetting element, reducing the chance of wall material being undesirably deposited on the display area rather than on the ridge. The manufacturing tolerances in such examples may thus be relaxed, while still reducing the likelihood or rate of satellite formation. FIGS. 1 to 3 show such an example; in these Figures, the distance d (illustrated in FIGS. 2 and 3), is 2 micrometers. In examples, the substantially parallel ridge surface of the ridge has this distance along approximately all of the length of the ridge, e.g. such that the ridge has an approximately uniform thickness along its length, although in other examples the ridge has a varying thickness, for example with a varying distance between the boundary in the electrowetting element and the inner surface of the wall.

The interior angle within the ridge between a plane of the substantially parallel ridge surface and a plane of the sloping ridge surface in examples also or alternatively satisfies an interior angle condition for the flow of the first fluid along the inner surface of the wall to be reduced. For example, the sloping ridge surface may be sloped or angled or otherwise angularly displaced relative to the substantially parallel ridge surface to guide or encourage flow of the first fluid away from the inner surface of the wall when the voltage is applied to the electrode of the element such that portions of the first fluid do not separate from the contracting portion of the first fluid. In such examples, by avoiding separation of the first fluid into portions or satellites next to or adjoining the inner surface of the wall, flow of the first fluid along the inner surface of the wall can be reduced, improving the display quality as described above. For example, by providing a ridge with a sloping ridge surface, the first fluid covering the sloping ridge surface is correspondingly reduced in depth, and therefore overall volume, due to the slope of the sloping ridge surface. Generally, the depth of the first fluid is smaller for first fluid covering a portion of the sloping ridge surface near to the wall than for first fluid covering a portion of the sloping ridge surface near to the hydrophobic surface 14 of the insulating layer 13, as shown in FIG. 1. A smaller quantity of first fluid covering the ridge in examples further reduces capillary action of first fluid along the inner surface of the wall, along the substantially planar surface and the sloping surface of the ridge, further improving the display quality of the electrowetting element. The skilled person would readily be able to determine whether an interior angle satisfies the interior angle condition, for example using methods similar to those described above for determining whether a distance satisfies a distance condition but testing electrowetting elements with a series of different interior angles rather than a series of different distances.

In examples, such as that of FIGS. 1 to 3, the interior angle is greater than or equal to approximately 135 degrees or is between approximately 135 degrees and approximately 160 degrees, for example between 135 degrees and 160 degrees within manufacturing errors. A first interior angle 44a within the first ridge 28a and a second interior angle 44b within the second ridge 44b is illustrated in FIG. 1. In this example, the first and second interior angles 44a, 44b are approximately the same or the same within manufacturing errors, although in other examples the first and second interior angles may be different from each other. The first interior angle 44a is also shown in FIG. 2. In example of FIGS. 1 to 3, the interior angle 44 is about 150 degrees or 150 degrees, although in other examples the interior angle may be larger or smaller.

The wall is located along at least part of a perimeter of the electrowetting element in examples. The wall may alternatively be located along at least part of an edge of a display area of the electrowetting element. For example, the wall may be located along, for example parallel to, adjacent to or overlapping all or part of a side of the electrowetting element or a side of the display area of the electrowetting element, where a side typically forms part of the perimeter of the electrowetting element or the edge of the display area. In such examples, the ridge may extend along a side of the electrowetting element or the display area, where a side of the electrowetting element or the display area is for example at an angle with respect to a neighbouring or adjoining side, for example meeting a neighbouring or adjoining side at a corner or junction region. The ridge is for example parallel to the side of the electrowetting element or the display area. A ridge is generally considered to be along a side of the electrowetting element or the display area for example where the ridge overlaps with the side of the electrowetting element or the display area (e.g. such that the ridge is at least partly within the electrowetting element or the display area) or where the ridge is next to, adjoining or adjacent to a side of the electrowetting element or the display area, but outside the electrowetting element or the display area. For example, the ridge may have a length approximately, for example substantially, equal to a length of the side of the electrowetting element or the display area such that the ridge (and the wall) is along an entire side of the electrowetting element or the display area. Flow of the first fluid in a direction along that side of the electrowetting element or the display area may therefore be reduced or prevented. The ridge typically has a thickness along its length, as noted above, for example such that the ridge forms a strip along the side of the electrowetting element or the display area.

In some examples, such a side is a first side of the electrowetting element, and the electrowetting element has a second side opposite to the first side. In these examples, the ridge is a first ridge extending along the first side of the electrowetting element, the substantially parallel ridge surface is a first substantially parallel ridge surface, the sloping ridge surface is a first sloping ridge surface, the wall is a first wall and the inner surface is a first wall inner surface. The support plate of such examples may also include a second ridge extending along the second side of the electrowetting element, the second ridge comprising a second substantially parallel ridge surface substantially parallel to the substrate surface and a second sloping ridge surface angled with respect to the second substantially parallel ridge surface, and a second wall located at least partly on the second substantially parallel ridge surface and having a second wall inner surface within the electrowetting element. In these examples, the second ridge can be a second ridge configured to reduce a flow of the first fluid along the second wall inner surface of the second wall with the first fluid and the second fluid switched to the first configuration. For example, the second ridge may be similar to the first ridge but in a different location (e.g. opposite to) than the first ridge.

FIG. 3 shows such an example. In FIG. 3, the display area 24 and the electrowetting element 2 itself is rectangular and has four sides. Four walls (a first wall, a second wall, a third wall and a fourth wall 21a, 21b, 21c, 21d) form an edge of the rectangular display area 24 and overlap with a perimeter or boundary of the electrowetting element 2. The first ridge 28a is along a first side of the electrowetting element 2 and the second ridge 28b is along a second side of the electrowetting element 2. The first and second ridges 28a, 28b are opposite to each other, for example they generally face each other and are across from each other. The first and second ridges 28a, 28b are both the same length as the length of the display area 24, and substantially the same length as the length of the electrowetting element 2 (in a direction of the first and second sides respectively) such that the first and second ridges 28a, 28b are along an entirety of the respective first and second sides of the display area 24 and along substantially an entirety of the respective first and second sides of the electrowetting element 2. As will be appreciated, in other examples, a ridge extends along a side of the electrowetting element or the display area with a length which is less than a length of a side of the electrowetting element or the display area. For example, the ridge may extend along at least approximately 50%, at least approximately 60%, at least approximately 70%, at least approximately 80%, at least approximately 90%, or approximately all of a side of the electrowetting element or the display area. Thus, the ridge may have a length of 50%, 60%, 70%, 80%, or 90% a length of a side of the electrowetting element or the display area.

In the example of FIG. 3, the first wall 21a is located on the first substantially parallel ridge surface 30a of the first ridge 28a and the second wall 21b, is located on the second substantially parallel ridge surface 30b of the second ridge 28b. In the example of FIG. 3, the first wall 21a is located on a left-hand side of the display area 24 and electrowetting element 2 and the second wall 21b is located on a right-hand side of the display area 24 and electrowetting element 2, although in other examples the first and second walls may be in different locations with respect to sides of the display area and/or electrowetting element. The third wall 21c and the fourth wall 21d are located partly on the first and second ridges 28a, 28b and partly on the central region of the hydrophobic surface 14 of the insulating layer 13, as shown in the FIG. With this arrangement, the first and second ridges 28a, 28b reduce the formation of portions of first fluid on the first and second substantially parallel ridge surfaces of the first and second ridges 28a, 28b respectively, thereby reducing the likelihood of formation of satellites of the first fluid and the associated reduction in display quality as explained above.

The sloping ridge surface in examples such as that of FIG. 3 is an inner sloping ridge surface within the electrowetting element, at least one of the first fluid or the second fluid in contact with the inner sloping ridge surface. In examples such as this, the ridge may further comprise an outer sloping ridge surface within an adjacent electrowetting element, at least one of a first fluid or a second fluid of the adjacent electrowetting element in contact with the outer sloping ridge surface. Such an example is shown schematically in FIGS. 1 to 3, in which the first and second ridges 28a, 28b both have inner and outer sloping ridge surfaces, the first inner sloping ridge surface 32a and the second inner sloping ridge surface 32b of the first and second ridges 28a, 28b respectively being within the electrowetting element 2, and the first outer sloping ridge surface 46a of the first ridge 28a and the second outer sloping ridge surface 46b of the second ridge 28b being within an electrowetting element adjacent, e.g. neighbouring or adjoining, the electrowetting element 2. In this way, one ridge can be used to reduce satellite formation in more than one electrowetting element, simplifying manufacture of the electrowetting display device.

Figure 4:
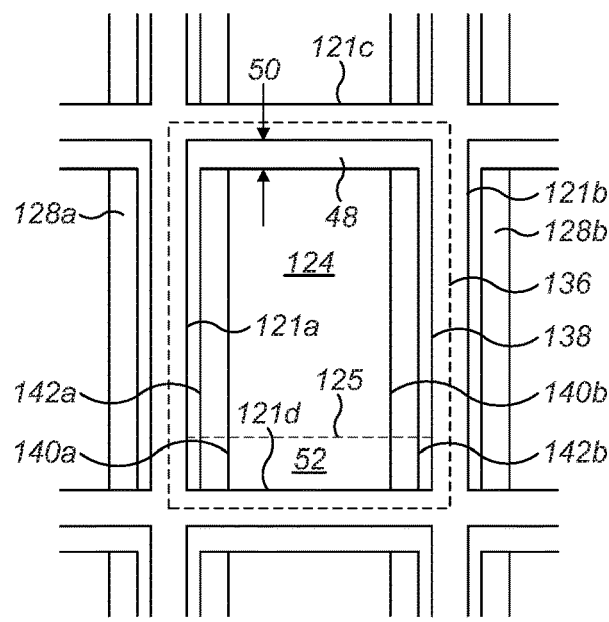
FIG. 4 shows schematically a plan view of an electrowetting element according to a further example.

FIG. 4 shows a different example electrowetting element in plan view. Features of FIG. 4 similar to those described with reference to FIGS. 1 to 3 are referred to here using the same reference numerals incremented by 100; corresponding descriptions should be taken to apply also.

In examples such as that of FIG. 4, the electrowetting element (and the display area) has a third side connecting the first side to the second side. In such examples, the support plate, e.g. the first support plate, comprises a protrusion extending along the third side of the electrowetting element. A third wall is located at least partly on a protrusion surface of the protrusion. A protrusion is typically a raised portion of the support plate, which is raised relative to a central region of the display area. For example, a distance between the protrusion and the second support plate may be less than a distance between the central region of the display area and the second support plate. In examples, a protrusion is a protuberance of the first support plate, which protrusion may be elongate or otherwise. The protrusion surface is generally an upper surface of the protrusion, upon which the third wall is at least partly supported, and may be substantially planar. The middle or central section of the third wall 121c is located on the protrusion and the end sections of the third wall 121c are located on the respective ends of the first and second ridges 128a, 128b. In FIG. 4, the protrusion 48 is a raised portion of the first support plate, which projects upwards with respect to the surface of the hydrophobic layer. The protrusion 48 in FIG. 4 has a sharp edge between the protrusion surface, upon which the third wall 121c is located, and a protrusion inner surface of the protrusion 48, which is substantially perpendicular or perpendicular to a plane of the protrusion surface and within the electrowetting element, such that the protrusion inner surface of the protrusion 48 is not visible in plan view as illustrated in FIG. 4. In other examples, the protrusion may slope gradually down from a boundary of the protrusion with a flat or curved sloping surface.

In examples such as that of FIG. 4, the first support plate comprises a continuous raised and longitudinal structure comprising the first ridge, the second ridge and the protrusion, and a continuous wall comprising the first wall, the second wall and the third wall. For example, an end of the first ridge may meet, join, merge or otherwise contact a first end of the protrusion. An end of the second ridge opposite to the end of the first ridge, across the display area, may meet, join, merge or otherwise contact a second end of the protrusion, opposite to the first end of the protrusion so as to form the continuous raised and longitudinal structure. For example, the first ridge may merge with the protrusion such that there is no break or gap between the first ridge and the protrusion, and the other end of the protrusion may merge with the second ridge similarly, for example such that the first ridge, the protrusion and the second ridge continuously surround three sides of the electrowetting element or the display area of the electrowetting element, with the protrusion between the first and second ridge. The first ridge, the second ridge and the protrusion in examples have substantially the same height, for example the same height within manufacturing tolerances, or the same height as each other, for example in the range of approximately 2 to approximately 5 micrometers. This typically allows the first ridge, the second ridge and the protrusion to be manufactured in the same layer as each other, which can simplify the manufacturing process. In such examples, the continuous wall may be located continuously on the first ridge, the protrusion and the second ridge so as to also surround these three sides of the electrowetting element or the display area. The continuous wall is located partly on a protrusion surface of the protrusion in examples, such as the example of FIG. 4, in which the third wall 121c is supported by and in contact with a protrusion surface of the protrusion 48, which in this example is an upper surface of the protrusion 48.

In examples, for example that of FIG. 4, the protrusion corresponds to an initiation location of the first support plate surface where motion of the first fluid initiates before motion of the first fluid initiates at a different location of the first support plate surface upon application of a voltage between the electrode and the second fluid to switch the first fluid and the second fluid from the first configuration, with the non-zero voltage applied between the electrode and the second fluid, to the second configuration, with the zero voltage applied between the electrode and the second fluid. The protrusion can for example correspond with or provide a well-defined place of initiation, e.g. near or adjacent to a wall of the element, where the first fluid starts to open or retract upon application of the voltage between the electrode and the second fluid. For example, the first fluid may start moving or retracting first at the initiation location, before beginning to move or retract at other locations of the first support plate surface, e.g. other locations of the display area. The initiation of the first fluid motion near the protrusion in an electrowetting element according to examples avoids changes of the place of initiation over time and between electrowetting elements. The protrusion therefore allows better control of the motion of the first fluid, improving the performance of the display device. In contrast, the ridge in examples reduces or eliminates flow of the first fluid along the inner surface of the wall and/or reduces formation of separate portions of the first fluid, e.g. on the substantially parallel ridge surface, when the first fluid layer breaks up upon application of a non-zero voltage between the electrode and the second fluid. Thus, in examples, the protrusion and the ridge have a different function from each other, yet both contribute to an improved control of first fluid motion.

In examples, a distance between the inner surface of the wall and a boundary of the protrusion, and in a direction substantially perpendicular to the third wall inner surface, is more than approximately 5 micrometers or 5 micrometers. FIG. 4 shows schematically such an example (not to scale). In FIG. 4, the distance 50 between the third wall inner surface of the third wall 121c and a boundary of the protrusion, e.g. an extent or limit of the protrusion, for example corresponding with an interface between the protrusion and a central region of the display area 24, which central region of the display area is the furthest region of the display area from the second support plate 6, is 8 micrometers, although in other examples the distance may be approximately 20 micrometers or more, for example 20 micrometers or more. The protrusion is typically a dielectric, which may comprise organic or inorganic material, and generally has a thickness in a range of approximately 0.5 to approximately 1.5 micrometers for example 0.5 to 1.5 micrometers. In contrast, the wall typically has a height of between approximately 2 and approximately 5 micrometers, e.g. approximately 3 micrometers, for example 3 micrometers. In examples, the protrusion and the wall have substantially the same height, for example the same height within manufacturing tolerances, or the same height. Where the protrusion is a dielectric layer, a dielectric constant of the protrusion is generally higher than a dielectric constant of the first fluid. For example, a dielectric constant of the protrusion may be approximately 8, for example 8, and a dielectric constant of the first fluid may be approximately 2.5, for example 2.5. In such examples, the distance between the edge of the protrusion and the wall is sufficiently large so as to form a channel along which the first fluid can flow, such that, when the voltage is applied to the electrode of the element, motion of the first fluid initiates near or next to the inner side of the wall above the protrusion, and the first fluid retracts from this location by flowing along the inner side of the wall and into the display area, towards the fourth side of the display area (opposite to the third side).

In further examples, the protrusion may be used in combination with other components of the electrowetting element to initiate motion of the first fluid. For example, the protrusion may be positioned in a region where a portion of the electrode is absent, which can cause an electric fringe field when a voltage between the electrode and the second fluid is applied. Where the electrode has a high portion located in the protrusion and there is a portion of the electrode missing or absent in the high portion of the electrode, the fringe field will have a relatively strong effect on the thin first fluid layer above the high portion. Hence, when raising the voltage, the increased electric field near the region where the electrode is absent will cause the first fluid to start moving preferentially near the region where the electrode is absent, e.g. near the protrusion.

The electrowetting element and/or the display area in examples, such as that of FIG. 4, has a fourth side opposite to the third side and connecting the first side to the second side. In such examples, the wall may comprise a fourth wall extending along the fourth side of the electrowetting element or the display area and located at least partly on a wall contact surface of the support plate. In examples, the wall contact surface is further from the second support plate than the protrusion surface, where the second support plate is for example a different support plate from that which comprises the first and second ridges and the protrusion (the first support plate, for example). The first fluid and the second fluid are typically located between the first support plate and the second support plate, as described above. FIG. 4 shows such an example schematically. In FIG. 4, the fourth wall 121d is located along a fourth side of the electrowetting element 2, which is opposite to the third side of the electrowetting element 2 along which the third wall 121c is located. The fourth wall 121d is located on, e.g. directly contacting or indirectly supported by, the surface of the display area 124 of the first support plate between the first and second ridges 128a, 128b, which may be referred to as a wall contact surface. The ridges and the protrusion are thus raised or protruding with respect to the wall contact surface in examples.

The electrowetting element in examples has a collection region adjacent to the fourth side of the electrowetting element. FIG. 4 shows such an example, in which the collection region 52 corresponds with the part of the display area adjoined by the first fluid when the first fluid is contracted into a dashed shape 125, although in other examples, the collection region may be smaller or larger than the part of the display area adjoined by the first fluid when retracted. The first fluid tends to collect in the collection region upon application of the voltage to control the configuration of the first and second fluids from the first configuration to the second configuration. The collection region may thus be considered to be an area or portion of the display area which tends to be adjoined by the first fluid when the first fluid is contracted due to the application of a voltage. For example, the collection region may always be covered by first fluid, regardless of the voltage applied to the element. The collection region may correspond with a relatively large region, e.g. 40 micrometers or larger, in which the electrode is absent. Since this region is large, the electric field in this region will be low and therefore the first fluid will tend to move towards the collection region when a voltage is applied to the electrode. A further electrode may be located in the support plate along the collection region, which is kept at the same voltage as the second fluid, to reduce the electric field in the collection region, to further improve collection of the first fluid in this region of the display area. By collecting the first fluid in this way, the uniformity of motion of the first fluid may be improved, meaning that the first fluid tends to move in the same direction each time a voltage is applied to the electrode in a particular electrowetting element and consistently for a plurality of electrowetting elements of the electrowetting display device.

Figure 5:
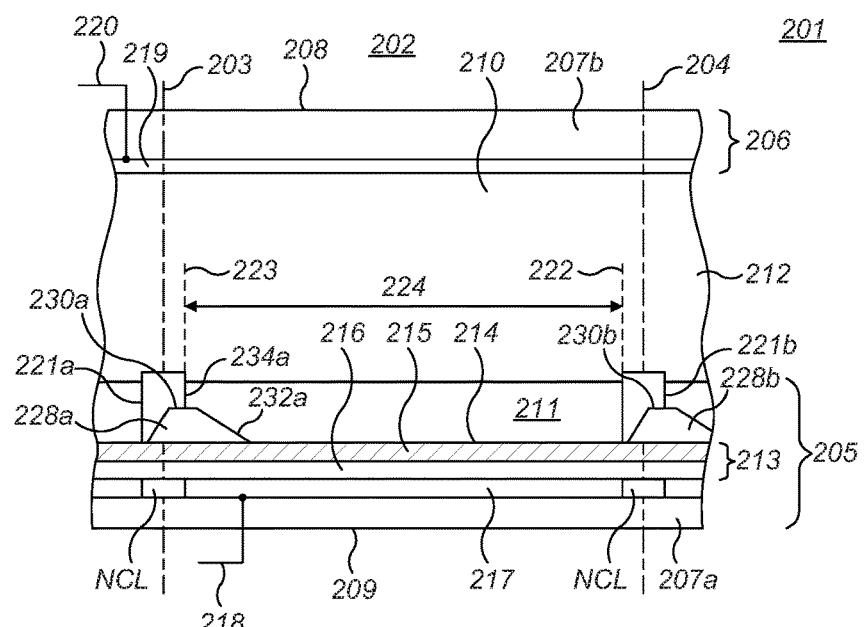
FIG. 5 shows schematically a cross-section of another example electrowetting element.
Figure 6:
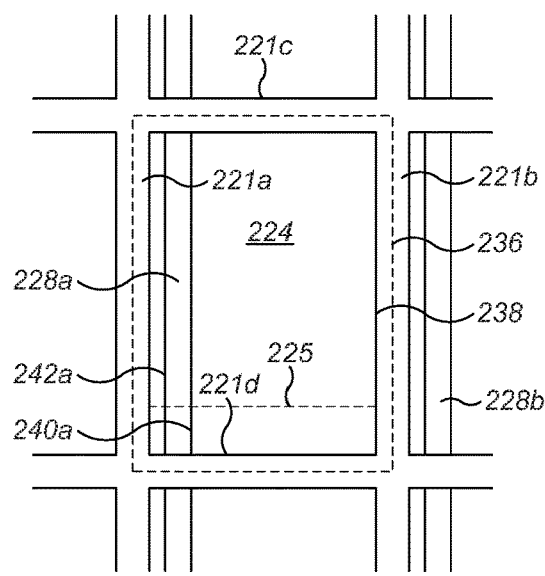
FIG. 6 shows schematically a plan view of the example electrowetting element of FIG. 5.

FIGS. 5 and 6 show another different electrowetting element in plan view according to examples. Features of FIGS. 5 and 6 similar to those described with reference to FIGS. 1 to 3 are referred to here using the same reference numerals incremented by 200; corresponding descriptions should be taken to apply also.

In the example of FIGS. 5 and 6, the electrowetting element 202 comprises a first ridge 228a. The first ridge 228a is formed of an organic material in this example, although other materials may be used to form the ridge in other examples. Unlike the example of FIGS. 1 to 3, in which the first and second ridges 28a, 28b extend into neighbouring electrowetting elements, in FIGS. 5 and 6, the first ridge 228a extends into the electrowetting element 202 only. In particular, in FIGS. 5 and 6, the substantially parallel ridge surface 230a of the first ridge 228a is between the dashed lines 203 and 204 and is therefore within the lateral extent of the electrowetting element 202. Similarly, the sloping ridge surface 232a is within the display area 224 of the electrowetting element 202. Therefore, the first ridge 228a is within the electrowetting element 202. An electrowetting element adjacent to the electrowetting element 202 has a second ridge 228b, which is present only in this adjacent electrowetting element and not in the electrowetting element 202 as the second ridge 228b does not have a sloping ridge surface and a substantially parallel ridge surface in the electrowetting element 202 as the substantially parallel ridge surface 230b of the second ridge 228b is outside the lateral extent of the electrowetting element 202. This is shown further in FIG. 6 in plan view. In this example, the ridges 228a, 228b are asymmetric about a vertical axis, although other examples may have symmetric ridges that nevertheless extend into one electrowetting element only.

In examples, such as those described above with reference to FIGS. 1 to 3, the first support plate comprises a hydrophobic layer having a hydrophobic surface. At least part of the hydrophobic layer partly forms the ridge. Thus, part of the hydrophobic layer may not form the ridge; for example, part of the hydrophobic layer may be in a central region of the display area, such as in the example of FIG. 1. In examples in which the first support plate comprises a hydrophobic layer, at least part of the substantially parallel ridge surface, for example the part within the display area 24, the sloping ridge surface and the first support plate surface may be formed by the hydrophobic surface, as is illustrated in FIGS. 1 and 2. FIGS. 5 and 6 differ from FIGS. 1 to 3. In examples such as that of FIGS. 5 and 6, the hydrophobic layer is beneath the ridge and does not form part of the ridge. In these examples, the ridge generally extends or protrudes upwards with respect to the hydrophobic layer. A hydrophobic layer is typically a layer with hydrophobic properties when a zero voltage is applied between the electrode (e.g. the first electrode 17 in the first support plate 5, referring to the example of FIG. 1), and the second fluid, for example in the absence of an electric field.

In examples, such as the example of FIGS. 1 to 3, the ridge comprises a first layer, the first layer being a hydrophobic layer, and a second layer comprising an organic material, the wall at least partly located on the first layer. The first layer is thus between the wall and the second layer in such examples, although in other examples, such as the example of FIGS. 5 and 6, the second layer may be between the wall and the first layer, such that the first layer is beneath the second layer. The ridge may comprise other materials or other layers between the first layer and the second layer, or the first layer and the second layer may be at least partly in contact with each other. An organic material is typically any material or compound which comprises a carbon atom bonded to a hydrogen atom, i.e. a C—H bond. An organic compound may for example be a polymer. In examples a polymer is a molecule formed of a plurality of repeating monomer molecules as the skilled person will understand, for example linked together to form a backbone of the polymer molecule. As will be appreciated by the skilled person, the repeating monomer molecules may not all be the same; for example the organic compound may be a co-polymer comprising a repetition of two different monomer molecules in an arbitrary ratio. In examples, the organic material comprises a plurality of polymer molecules which together may form an amorphous solid material; the term amorphous is considered to mean that a material is substantially, for example predominantly, or entirely, non-crystalline. A non-crystalline material for example has no crystalline structures, or is not predominantly crystalline, a crystalline structure having a regular structure, for example with an ordered arrangement of atoms therein, which for example are arranged as a two dimensional or three dimensional lattice. In other examples, the organic material may comprise a polymer with a substantially (for example predominantly, or entirely) crystalline structure, which for example has an ordered arrangement of molecule chains, such as folded chains. In examples, the second layer is transparent so as to avoid any reduction in brightness associated with a non-transparent ridge in the display area. The second layer is for example a polymer-based transparent photoresist, typically a negative photoresist although a positive photoresist may also be used. The second layer may have a relatively high dielectric constant, for example higher than a dielectric constant of the second fluid.

The hydrophobic layer, e.g. the first layer, of a ridge may be formed of the same material as the hydrophobic layer 15 of the insulating layer 13, e.g. Teflon® AF1600, and may be formed at the same time as and/or integrally with the hydrophobic layer of the insulating layer, using for example a slot die coating or spincoating process, as the skilled person would appreciate. The hydrophobic layer of the ridge may be treated, for example to change a property of the hydrophobic layer, for example to reduce the wettability for the first fluid. This treatment may be reactive ion etching (RIE), for example using radio frequency initiated plasma, which the skilled person would readily be familiar with and which can be applied selectively, for example on the substantially parallel ridge surface of the ridge, to improve adhesion between the material of the wall to be located on the substantially parallel ridge surface and the surface of the hydrophobic layer in the region corresponding to the substantially parallel ridge surface of the ridge. The ridge may comprise other materials or other materials than an organic material and a hydrophobic material.

In examples, the ridge and the wall comprise the same material, although in other examples the ridge and the wall may comprise different materials from each other. For example, both the ridge and the wall may include organic material, such as that described above. This can allow the ridge and the wall to be manufactured using the same equipment, reducing manufacturing costs and simplifying the manufacturing process relative to the example in which the ridge and the wall are formed of different materials.

Figure 7:
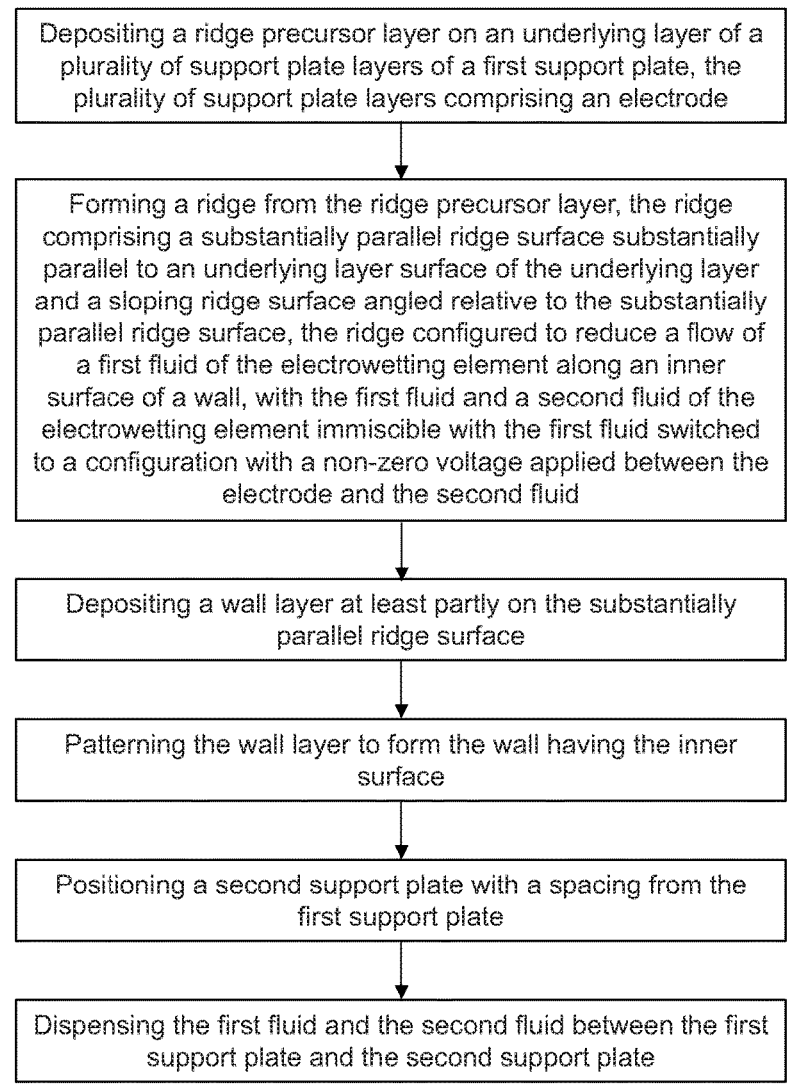
FIG. 7 shows a flow diagram of an example method of manufacturing an electrowetting element.

A method of manufacturing an electrowetting element, such as the electrowetting element described in examples herein, according to examples is shown in FIG. 7.

During the manufacturing process of the display device, the first support plate may be manufactured or entirely, or may be provided during the manufacturing process as a partly or completely assembled support plate. In examples such as that of FIG. 7, the method comprises depositing a ridge precursor layer on an underlying layer of a plurality of support plate layers of a first support plate, the plurality of support plate layers comprising an electrode. The underlying layer is for example a substrate of the first support plate such as the substrate 7a of FIG. 1. The ridge precursor layer may be deposited for example using a slot die coating or a spincoating process. The plurality of support plate layers may include a barrier layer such as the barrier layer 16 of FIG. 1. The electrode may be in the form of a layer. The ridge precursor layer for example comprises an organic material as described above. A ridge is formed from the ridge precursor layer, the ridge comprising a substantially parallel ridge surface substantially parallel to an underlying layer surface of the underlying layer and a sloping ridge surface angled with respect to the substantially parallel ridge surface, the ridge configured to reduce a flow of a first fluid of the electrowetting element along an inner surface of a wall, with the first fluid and a second fluid of the electrowetting element immiscible with the first fluid switched to a configuration with a non-zero voltage applied between the electrode and the second fluid. For example, the ridge may be the same as or similar to the ridges 28a, 28b and 228a, 228b of FIGS. 1 and 5 respectively. In examples, the ridge is formed with an interior angle within the ridge, between a plane of the substantially parallel ridge surface and a plane of the sloping ridge surface, of greater than or equal to approximately 135 degrees, or between approximately 135 degrees and approximately 160 degrees, for example as described above with reference to FIGS. 1 to 3.

The ridge in examples is formed by patterning the ridge precursor layer. For example, the ridge precursor layer may be patterned to form a patterned ridge precursor layer and a hydrophobic layer may be deposited on the patterned ridge precursor layer, a surface of the hydrophobic layer comprising the substantially parallel ridge surface and the sloping ridge surface. In examples such as this, the ridge may therefore include at least part of a hydrophobic layer. One or more further layers may be deposited to cover or partly form the ridge in addition to or instead of the hydrophobic layer.

The method of FIG. 7, and examples in accordance with FIG. 7, further includes depositing a wall layer at least partly on the substantially parallel ridge surface, e.g. using a slot die coating or a spincoating process, and patterning the wall layer to form a wall having an inner surface within the electrowetting, such as the walls 21 and 221 of FIGS. 1 and 5 respectively. As noted above, the wall layer may also comprise an organic material.

Where the ridge and/or the wall comprise a photoresist material, such as an organic photoresist material, the ridge and/or the wall may be formed, e.g. patterned using a photolithographic process, as the skilled person will appreciate. To form the sloping ridge surface of the ridge, the ridge may be illuminated, through a mask, with a beam of radiation which is slanting or oblique with respect to a central portion of the first support plate 5. By a suitable choice of a plane of incidence of the radiation, different configurations of sloping ridge surfaces may be obtained. In other examples, the ridge is illuminated with radiation through a greyscale mask or using a differential, location-dependent focusing, to obtain a sloping ridge surface of the ridge, as the skilled person will understand. For example, a location-dependent variable focus of exposure of the surface of the ridge to radiation may be used to manufacture a curved sloping ridge surface.

As noted above, the ridge and the wall may be formed integrally, e.g. where they are formed of the same material. For example the ridge precursor layer and the wall precursor layer may be deposited on the substrate in one combined ridge and wall precursor layer using a slot die coating or spincoating process. Then the combined ridge and wall precursor layer may be patterned appropriately to form the ridge and the wall.

In examples, the patterning the wall layer comprises patterning the wall layer to form a distance between the inner surface of the wall and a boundary of the substantially parallel ridge surface, and in a direction substantially perpendicular to the inner surface of the wall, of less than or equal to approximately 5 micrometers, or approximately equal to zero micrometers, for example as described above with reference to FIGS. 1 to 3.

In example methods such as that of FIG. 7, once the ridge and the wall have been formed, a second support plate, for example a pre-manufactured second support plate, may be positioned with a spacing from the first support plate to assemble one or more electrowetting elements. The first and second support plates in examples are then attached together, for example using an adhesive seal at an outermost perimeter of an array of the one or more electrowetting elements, after having dispensed the first and second fluids in the space to be formed between the first and second support plates. In other examples, the first and second support plates may be attached together, e.g. by a seal, and subsequently the first and second fluids may be dosed between the first and second support plates, for example through a hole or gap in the seal. The skilled person will readily appreciate suitable techniques for this.

It is to be appreciated that in further examples, other manufacturing methods may be used to manufacture an electrowetting element according to examples herein.

Figure 8:
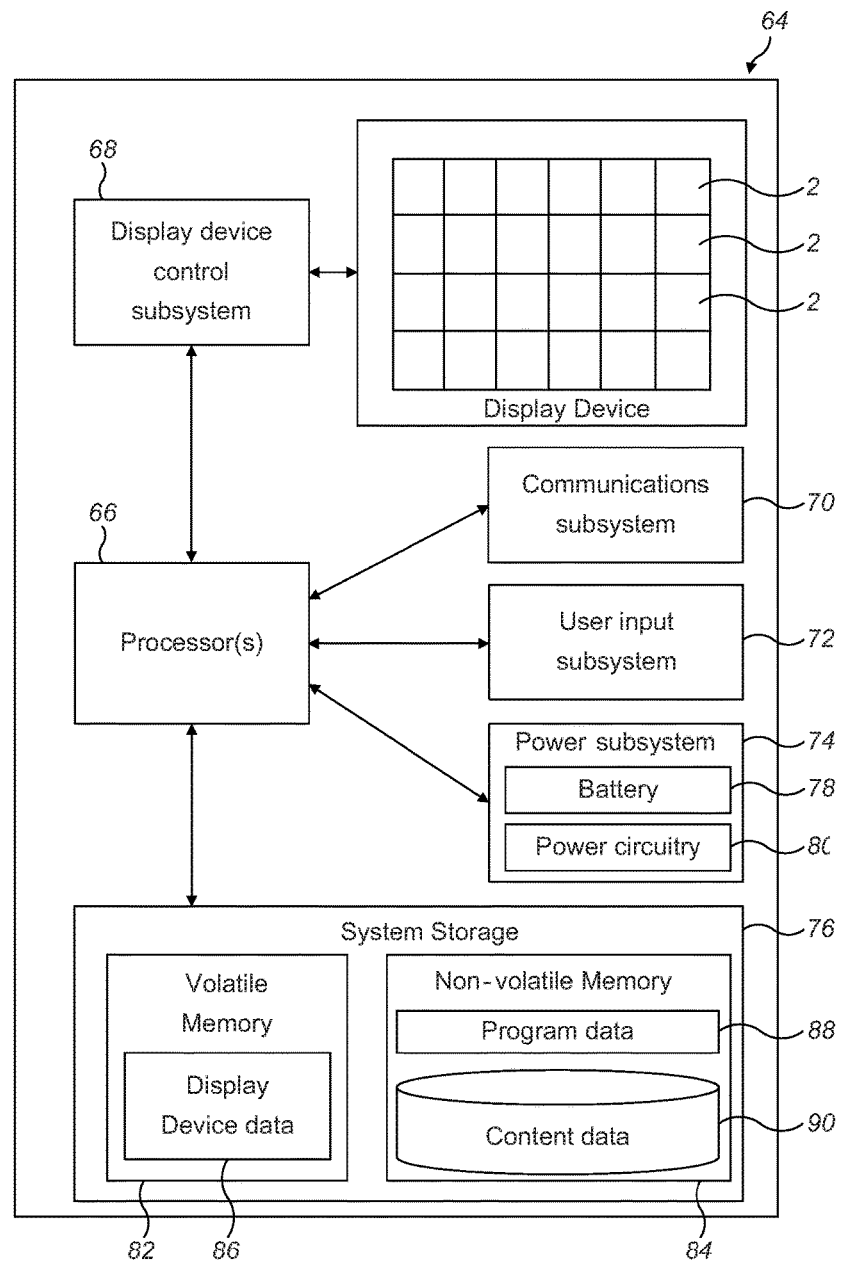
FIG. 8 shows schematically a system diagram of an example apparatus including an electrowetting display device.

FIG. 8 shows schematically a system diagram of an example system, for example apparatus 64, comprising an electrowetting display device such as the electrowetting display device 1 described above with reference to FIG. 1 comprising electrowetting elements 2, although the system of FIG. 8 can be used with any of the example electrowetting elements described above. The apparatus is for example a portable, e.g. mobile, device such as an electronic reader device such as a so-called e-reader, a tablet computing device, a laptop computing device, a mobile telecommunications device, a watch or a satellite navigation device; the apparatus may alternatively be a display screen for installation in any machine or device requiring a display screen, for example a consumer appliance.

The system diagram illustrates an example of a basic hardware architecture of the apparatus 64. The apparatus includes at least one processor 66 connected to and therefore in data communication with for example: a display device control subsystem 68, a communications subsystem 70, a user input subsystem 72, a power subsystem 74 and system storage 76. The display device control subsystem is connected to and is therefore in data communication with the display device 1. The at least one processor 66 is for example a general purpose processor, a microprocessor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration. The processor may be coupled, via one or more buses, to read information from or write information to one or more memories, for example those of the system storage 76. The at least one processor may additionally, or in the alternative, contain memory, such as processor registers.

The display device control subsystem 68 for example includes electrowetting element driver components, for use in applying a voltage to any of the electrowetting elements, to address different such display elements. In examples the electrowetting elements are configured according to an active matrix configuration and the display device control subsystem is configured to control switching elements such as thin film transistors (TFTs) of the display device 1 via circuitry to control the electrowetting elements. The circuitry may include signal and control lines such as those described above.

The communications subsystem 70 for example is configured for the apparatus to communicate with for example a computing device via a data network, for example a computer network such as the Internet, a local area network, a wide area network, a telecommunications network, a wired network, a wireless network, or some other type of network. The communications subsystem 70 may further for example comprise an input/output (I/O) interface, such as a universal serial bus (USB) connection, a Bluetooth or infrared connection, or a data network interface for connecting the apparatus to a data network such as any of those described above. Content data as described later may be transferred to the apparatus via the communications subsystem.

The user input subsystem 72 may include for example an input device for receiving input from a user of the apparatus. Example input devices include, but are not limited to, a keyboard, a rollerball, buttons, keys, switches, a pointing device, a mouse, a joystick, a remote control, an infrared detector, a voice recognition system, a bar code reader, a scanner, a video camera (possibly coupled with video processing software to, e.g., detect hand gestures or facial gestures), a motion detector, a microphone (possibly coupled to audio processing software to, e.g., detect voice commands), or other device capable of transmitting information from a user to the device. The input device may also take the form of a touch-screen associated with the display device, in which case a user responds to prompts on the display device by touch. The user may enter textual information through the input device such as the keyboard or the touch-screen.

The apparatus may also include a user output subsystem (not illustrated) including for example an output device for providing output to a user of the apparatus. Examples include, but are not limited to, a printing device, an audio output device including for example one or more speakers, headphones, earphones, alarms, or haptic output devices. The output device may be a connector port for connecting to one of the other output devices described, such as earphones.

The power subsystem 74 for example includes power circuitry 80 for use in transferring and controlling power consumed by the apparatus. The power may be provided by a mains electricity supply or from a battery 78, via the power circuitry. The power circuitry may further be used for charging the battery from a mains electricity supply.

The system storage 76 includes at least one memory, for example at least one of volatile memory 82 and non-volatile memory 84 and may comprise a non-transistory computer readable storage medium. The volatile memory may for example be a Random Access Memory (RAM). The non-volatile (NV) memory may for example be a solid state drive (SSD) such as Flash memory, or Read Only Memory (ROM). Further storage technologies may be used, for example magnetic, optical or tape media, compact disc (CD), digital versatile disc (DVD), Blu-ray or other data storage media. The volatile and/or non-volatile memory may be removable or non-removable.

Any of the memories may store data for controlling the apparatus, for example components or subsystems of the apparatus. Such data may for example be in the form of computer readable and/or executable instructions, i.e. computer program instructions. Therefore, the at least one memory and the computer program instructions may be configured to, with the at least one processor, control a display effect provided by the electrowetting display device.

In the example of FIG. 8, the volatile memory 82 stores for example display device data 86 which is indicative of display effects to be provided by the display device 1. The processor 66 may transmit data, based on the display device data, to the display device control subsystem 68 which in turn outputs signals to the display device for applying voltages to the display elements, for providing display effects from the display device. The non-volatile memory 84 stores for example program data 88 and/or content data 90. The program data is for example data representing computer executable instructions, for example in the form of computer software, for the apparatus to run applications or program modules for the apparatus or components or subsystems of the apparatus to perform certain functions or tasks, and/or for controlling components or subsystems of the apparatus. For example, application or program module data includes any of routines, programs, objects, components, data structures or similar. The content data is for example data representing content for example for a user; such content may represent any form of media, for example text, at least one image or a part thereof, at least one video or a part thereof, at least one sound or music or a part thereof. Data representing an image or a part thereof is for example representative of a display effect to be provided by at least one electrowetting element of the electrowetting display device. The content data may include data representing a library of content, for example a library of any of books, periodicals, newspapers, movies, videos, music, or podcasts, each of which may be represented by a collection of data which represents for example one book or one movie. Such a collection of data may include content data of one type, but may instead include a mixture of content data of different types, for example a movie may be represented by data including at least image data and sound data.

The above examples are to be understood as illustrative examples. Further examples are envisaged. In further examples, the support plate comprises a third ridge, similar to the first and second ridges, as well as the first and second ridges. The third ridge in some examples is along the third side of the electrowetting element or the display area (instead of the protrusion as shown in the example of FIG. 4). The first, second and third ridges may form a continuous ridge. In still further examples, the support plate comprises a fourth ridge, similar to the first and second ridges, as well as first, second and third ridges as described above. The fourth ridge may be located to extend along the fourth side of the electrowetting element or the display area, and may, with the first, second and third ridges, form a continuous ridge, which for example extends entirely around the electrowetting element or the display area.

In the example of FIG. 1, there is a sharp edge between the substantially parallel ridge surface and the sloping ridge surface, for example with the angle between a plane of the substantially parallel ridge surface and a plane of the sloping ridge surface, e.g. an interior angle as described above, changing abruptly, for example over a short distance compared with a thickness of the ridge. In further examples, there is a sloping edge between these surfaces, for example with a gradually changing angle between these surfaces. This can further reduce formation of first fluid satellites and/or flow of such satellites along the inner surface of the wall, for example by allowing the first fluid to easily flow away from the wall, without becoming trapped next to the wall.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. An electrowetting element comprising:
a first fluid;
a second fluid immiscible with the first fluid;
a first support plate and a second support plate, the first fluid and the second fluid located between the first support plate and the second support plate, the first support plate comprising:
a first support plate surface, at least one of the first fluid or the second fluid in contact with the first support plate surface;
a substrate having a substrate surface;
an electrode, the first fluid and the second fluid switchable to a first configuration with a non-zero voltage applied between the electrode and the second fluid;
a ridge comprising a top surface substantially parallel to the substrate surface and a side surface angled relative to the top surface of the ridge, wherein an interior angle within the ridge between a plane of the top surface of the ridge and a plane of the side surface of the ridge is greater than or equal to approximately 135 degrees and less than 180 degrees, the ridge having a height, between a plane of the first support plate surface and the plane of the top surface of the ridge, the height of the ridge being less than a
thickness of the first fluid, with the first fluid and the second fluid in a second configuration with a zero voltage applied between the electrode and the second fluid, in a direction substantially perpendicular to the plane of the first support plate surface; and
a wall located at least partly on the top surface of the ridge with the wall at least partly between the top surface of the ridge and the second support plate, the wall having an inner surface within the electrowetting element,
the ridge configured to limit a flow of the first fluid along the inner surface of the wall with the first fluid and the second fluid switched to the first configuration.

2. The electrowetting element according to claim 1, wherein a distance between the inner surface of the wall and a boundary of the top surface of the ridge, and in a direction perpendicular to the inner surface of the wall, is less than or equal to approximately 5 micrometers, or approximately equal to zero micrometers.

3. The electrowetting element according to claim 1, wherein the ridge and the wall comprise the same material.

4. The electrowetting element according to claim 1, wherein the first support plate comprises:
a hydrophobic layer having a hydrophobic surface,
the ridge comprising at least part of the hydrophobic layer, the hydrophobic surface comprising at least part of the top surface of the ridge, the side surface of the ridge and the first support plate surface.

5. The electrowetting element according to claim 1, wherein the ridge comprises a first layer, the first layer being a hydrophobic layer, and a second layer comprising an organic material, the wall located at least partly on the first layer.

6. The electrowetting element according to claim 1, wherein the ridge extends along: at least approximately 50%, at least approximately 60%, at least approximately 70%, at least approximately 80%, at least approximately 90%, or approximately all of a side of the electrowetting element.

7. The electrowetting element according to claim 1, wherein the electrowetting element has a first side and a second side opposite to the first side, and
the ridge is a first ridge extending along the first side of the electrowetting element, the wall is a first wall and the inner surface is a first wall inner surface,
the first support plate comprising:
a second ridge which extends along the second side of the electrowetting element, the second ridge comprising a top surface substantially parallel to the substrate surface and a side surface angled relative to the top surface of the second ridge; and
a second wall located at least partly on the top surface of the second ridge, the second wall having a second wall inner surface within the electrowetting element,
the second ridge configured to limit a flow of the first fluid along the second wall inner surface of the second wall with the first fluid and the second fluid switched to the first configuration.

8. The electrowetting element according to claim 1, wherein the electrowetting element has a first side, a second side opposite to the first side and a third side connecting the first side to the second side, and
the ridge is a first ridge which extends along the first side of the electrowetting element, the wall is a first wall and the inner surface is a first wall inner surface,
the first support plate comprising:
a second ridge which extends along the second side of the electrowetting element, the second ridge comprising a top surface substantially parallel to the substrate surface and a side surface angled relative to the top surface of the second ridge;
a protrusion which extends along the third side of the display area;
a second wall located at least partly on the top surface of the second ridge, the second wall having a second wall inner surface within the electrowetting element,
the second ridge configured to limit a flow of the first fluid along the second wall inner surface of the second wall with the first fluid and the second fluid switched to the first configuration; and
a third wall located at least partly on a protrusion surface of the protrusion.

9. The electrowetting element according to claim 8, wherein the first support plate comprises:
a continuous raised and longitudinal structure comprising the first ridge, the second ridge and the protrusion; and
a continuous wall comprising the first wall, the second wall and the third wall.

10. The electrowetting element according to claim 8, wherein the protrusion corresponds to an initiation location of the first support plate surface where motion of the first fluid initiates before motion of the first fluid initiates at a different location of the first support plate surface upon application of a voltage between the electrode and the second fluid to switch the first fluid and the second fluid from the second configuration.

11. The electrowetting element according to claim 8, wherein a distance between a third wall inner surface of the third wall and a boundary of the protrusion, and in a direction perpendicular to the third wall inner surface, is more than approximately 5 micrometers.

12. The electrowetting element according to claim 8, wherein the electrowetting element has a fourth side opposite to the third side, and the fourth side connects the first side to the second side, the first support plate comprising:
a wall contact surface further from the second support plate than the protrusion surface; and
a fourth wall which extends along the fourth side of the electrowetting element and is located at least partly on the wall contact surface.

13. The electrowetting element according to claim 8, wherein the electrowetting element has:
a fourth side opposite to the third side and which fourth side connects the first side to the second side; and
a collection region adjacent to the fourth side of the electrowetting element where the first fluid tends to collect upon application of a voltage to switch the first fluid and the second fluid from the second configuration.

14. The electrowetting element according to claim 1, wherein the first fluid is electrically non-conductive and the second fluid is at least one of: electroconductive or polar.

15. The electrowetting element according to claim 1, wherein a wall height of the wall is less than a ridge height of the ridge in a direction perpendicular to the top surface of the ridge.

16. An apparatus comprising:
an electrowetting element comprising:
a first fluid;
a second fluid immiscible with the first fluid;
a first support plate and a second support plate, the first fluid and the second fluid located between the first support plate and the second support plate, the first support plate comprising:
a first support plate surface in contact with at least one of the first fluid or the second fluid;
a substrate having a substrate surface;
an electrode;
a ridge comprising a top surface substantially parallel to the substrate surface and a side surface angled relative to the top surface of the ridge, wherein an interior angle within the ridge between a plane of the top surface of the ridge and a plane of the side surface of the ridge is greater than or equal to approximately 135 degrees and less than 180 degrees, the ridge having a height, between a plane of the first support plate surface and the plane of the top surface of the ridge, the height of the ridge being less than a thickness of the first fluid, with the first fluid and the second fluid in a second configuration with a zero voltage applied between the electrode and the second fluid, in a direction substantially perpendicular to the plane of the first support plate surface; and
a wall located at least partly on the top surface of the ridge such that the 'wall is at least partly between the top surface of the ridge and the second support plate, the wall having an inner surface within the electrowetting element,
the ridge configured to limit a flow of the first fluid along the inner surface of the wall with the first fluid and the second fluid switched to a first configuration with a non-zero voltage applied between the electrode and the second fluid;
at least one processor; and
at least one memory comprising computer program instructions, the at least one memory and the computer program instructions configured to, with the at least one processor, switch the first fluid and the second fluid between the first configuration and the second configuration.

17. The apparatus according to claim 16, wherein a distance between the inner surface of the wall and a boundary of the top surface of the ridge, and in a direction perpendicular to the inner surface of the wall, is less than or equal to approximately 5 micrometers, or approximately equal to zero micrometers.

18. The apparatus according to claim 16, comprising an adjacent electrowetting element adjacent to the electrowetting element, wherein the side surface of the ridge is an inner second surface within the electrowetting element, at least one of the first fluid or the second fluid in contact with the inner second surface, and the ridge further comprises an outer second surface within the adjacent electrowetting element, at least one of a first fluid or a second fluid of the adjacent electrowetting element in contact with the outer second surface.

19. The apparatus according to claim 16, wherein the ridge and the wall comprise the same material.

20. The apparatus according to claim 16, wherein the ridge comprises a first layer, the first layer being a hydrophobic layer, and a second layer comprising an organic material, the wall located at least partly on the first layer.

21. The apparatus according to claim 16, wherein the electrowetting element has a first side and a second side opposite to the first side, and
the ridge is a first ridge extending along the first side of the electrowetting element, the wall is a first wall and the inner surface is a first wall inner surface,
the first support plate comprising:
a second ridge which extends along the second side of the electrowetting element, the second ridge comprising a top surface substantially parallel to the substrate surface and a side surface angled relative to the top surface of the second ridge; and
a second wall located at least partly on the top surface of the second ridge, the second wall having a second wall inner surface within the electrowetting element, the second ridge configured to limit a flow of the first fluid along the second wall inner surface of the second wall with the first fluid and the second fluid switched to the first configuration.

22. The apparatus according to claim 16, wherein a wall height of the wall is less than a ridge height of the ridge in a direction parallel to the top surface of the ridge.

23. A method of manufacturing an electrowetting element comprising:
depositing a ridge precursor layer on an underlying layer of a plurality of support plate layers of a first support plate, the plurality of support plate layers comprising an electrode;
forming a ridge from the ridge precursor layer, the ridge comprising a top surface substantially parallel to an underlying layer surface of the underlying layer and a side surface angled relative to the top surface of the ridge, wherein an interior angle within the ridge between a plane of the top surface of the ridge and a plane of the side surface of the ridge is greater than or equal to approximately 135 degrees and less than 180 degrees, the ridge configured to limit a flow of a first fluid of the electrowetting element along an inner surface of a wall, with the first fluid and a second fluid of the electrowetting element immiscible with the first fluid switched to a configuration with a non-zero voltage applied between the electrode and the second fluid, the ridge having a height, between a plane of the underlying layer surface and the plane of the top surface of the ridge, wherein the height of the ridge is less than a thickness of the first fluid, with the first fluid and the second fluid in a second configuration with a zero voltage applied between the electrode and the second fluid, in a direction substantially perpendicular to the plane of the underlying layer surface;

depositing a wall layer at least partly on the top surface of the ridge such that the top surface of the ridge at least partly underlies the wall layer;

patterning the wall layer to form the wall having the inner surface;

positioning a second support plate with a spacing from the first support plate; and dispensing the first fluid and the second fluid between the first support plate and the second support plate.

24. The method according to claim 23, the patterning the wall layer comprising patterning the wall layer to form a distance between the inner surface of the wall and a boundary of the top surface of the ridge, and in a direction perpendicular to the inner surface of the wall, of less than or equal to approximately 5 micrometers, or approximately equal to zero micrometers.

25. The method according to claim 23, comprising:

patterning the ridge precursor layer to form a patterned ridge precursor layer; and depositing a hydrophobic layer on the patterned ridge precursor layer, a surface of the hydrophobic layer comprising the top surface of the ridge and the side surface of the ridge.

* * * * *